(12) United States Patent
Chiang et al.

(10) Patent No.: US 9,294,486 B1
(45) Date of Patent: Mar. 22, 2016

(54) MALWARE DETECTION AND ANALYSIS

(71) Applicant: Sandia Corporation, Albuquerque, NM (US)

(72) Inventors: Ken Chiang, San Francisco, CA (US); Levi Lloyd, Livermore, CA (US); Jonathan Crussell, Pleasanton, CA (US); Benjamin Sanders, Dublin, CA (US); Jeremy Lee Erickson, Fremont, CA (US); David Jakob Fritz, Fort Collins, CO (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/198,366

(22) Filed: Mar. 5, 2014

(51) Int. Cl.
*H04L 29/06* (2006.01)

(52) U.S. Cl.
CPC ................................. *H04L 63/14* (2013.01)

(58) Field of Classification Search
CPC ..... G06F 21/52; G06F 21/577; G06F 21/563; G06F 2221/2119
USPC .................................................... 726/23, 24
See application file for complete search history.

(56) References Cited

U.S. PATENT DOCUMENTS

| | | | |
|---|---|---|---|
| 7,181,445 B2* | 2/2007 | Bebo et al. | |
| 7,809,670 B2* | 10/2010 | Lee et al. | 706/59 |
| 7,913,305 B2* | 3/2011 | Bodorin et al. | 726/24 |
| 8,769,683 B1* | 7/2014 | Oliver | 726/23 |
| 2010/0011441 A1 | 1/2010 | Christodorescu et al. | |
| 2012/0079596 A1* | 3/2012 | Thomas et al. | 726/24 |

OTHER PUBLICATIONS

Christodorescu et al. (Malware Normalization, Technical Report #1539, Nov. 2005, 36 pages).*
Singer, N., "Peeling the onion of malware," Sandia Lab News: Jun. 18, 2010, 6 pages, http://www.sandia.gov/LabNews/100618.html, retrieved Sep. 19, 2013.
Van Randwyk, J. et al., "Farm: An Automated Malware Analysis Environment," 2008 IEEE, ICCST 2008, pp. 321-325.

(Continued)

*Primary Examiner* — Saleh Najjar
*Assistant Examiner* — Oleg Korsak
(74) *Attorney, Agent, or Firm* — Blakely, Sokoloff, Taylor & Zafman LLP

(57) ABSTRACT

Embodiments of the invention describe systems and methods for malicious software detection and analysis. A binary executable comprising obfuscated malware on a host device may be received, and incident data indicating a time when the binary executable was received and identifying processes operating on the host device may be recorded. The binary executable is analyzed via a scalable plurality of execution environments, including one or more non-virtual execution environments and one or more virtual execution environments, to generate runtime data and deobfuscation data attributable to the binary executable. At least some of the runtime data and deobfuscation data attributable to the binary executable is stored in a shared database, while at least some of the incident data is stored in a private, non-shared database.

19 Claims, 8 Drawing Sheets

(56) References Cited

OTHER PUBLICATIONS

Zorz, Z., "Scanner identifies malware strains, could be future of AV," Help Net Security, Posted on May 24, 2013, 2 pages, http://www.net-security.org/malware_news.php?id=2505.

Braue, D., "AusCERT 2013: Cloud-based scanner identifies new malware by its ancestry," CSO Online (Australia), May 23, 2013, 3 pages, http://www.cso.com.au/article/462670/auscert_2013_cloud-based_scanner_identifies_new_malware_by_its_ancestry/, retrieved Sep. 19, 2013.

\* cited by examiner

| Hash Key: | 0xffff eeee dddd cccc …. |
|---|---|
| File Name: | file_name1.exe |
| File Size: | size1 mb |
| Date: | date1 |

500

| Hash Key: | 0xbbbb aaaa 9999 8888 … |
|---|---|
| File Name: | file_name2.exe |
| File Size: | size2 mb |
| Date: | date2 |

MALWARE DETECTION AND ANALYSIS

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to computer security, and in particular but not exclusively, relates to malicious software detection and analysis.

BACKGROUND INFORMATION

Malicious software (i.e., 'malware'), such as viruses, spyware and rootkits, has become increasing difficult for computer systems to detect and protect against. This is in part due to the evolving complexity and form of malware. Obfuscation techniques by malware creators often change the form and function of a single piece of malware, rendering straightforward virus detection techniques (such as file signature or code detection) obsolete.

SUMMARY OF INVENTION

Embodiments of the invention describe systems and methods for malicious software detection and analysis. A binary executable comprising obfuscated malware on a host device may be received, and incident data indicating a time when the binary executable was received and identifying processes operating on the host device may be recorded. The binary executable is analyzed via a scalable plurality of execution environments, including one or more non-virtual execution environments and one or more virtual execution environments, to generate runtime data and deobfuscation data attributable to the binary executable. At least some of the runtime data and deobfuscation data attributable to the binary executable is stored in a shared database, while at least some of the incident data is stored in a private, non-shared database.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5 is an illustration of file information for received malware according to an embodiment of the disclosure.

DETAILED DESCRIPTION

Embodiments of a system and method for malicious software (alternatively referred to herein as "malware") detection and analysis are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
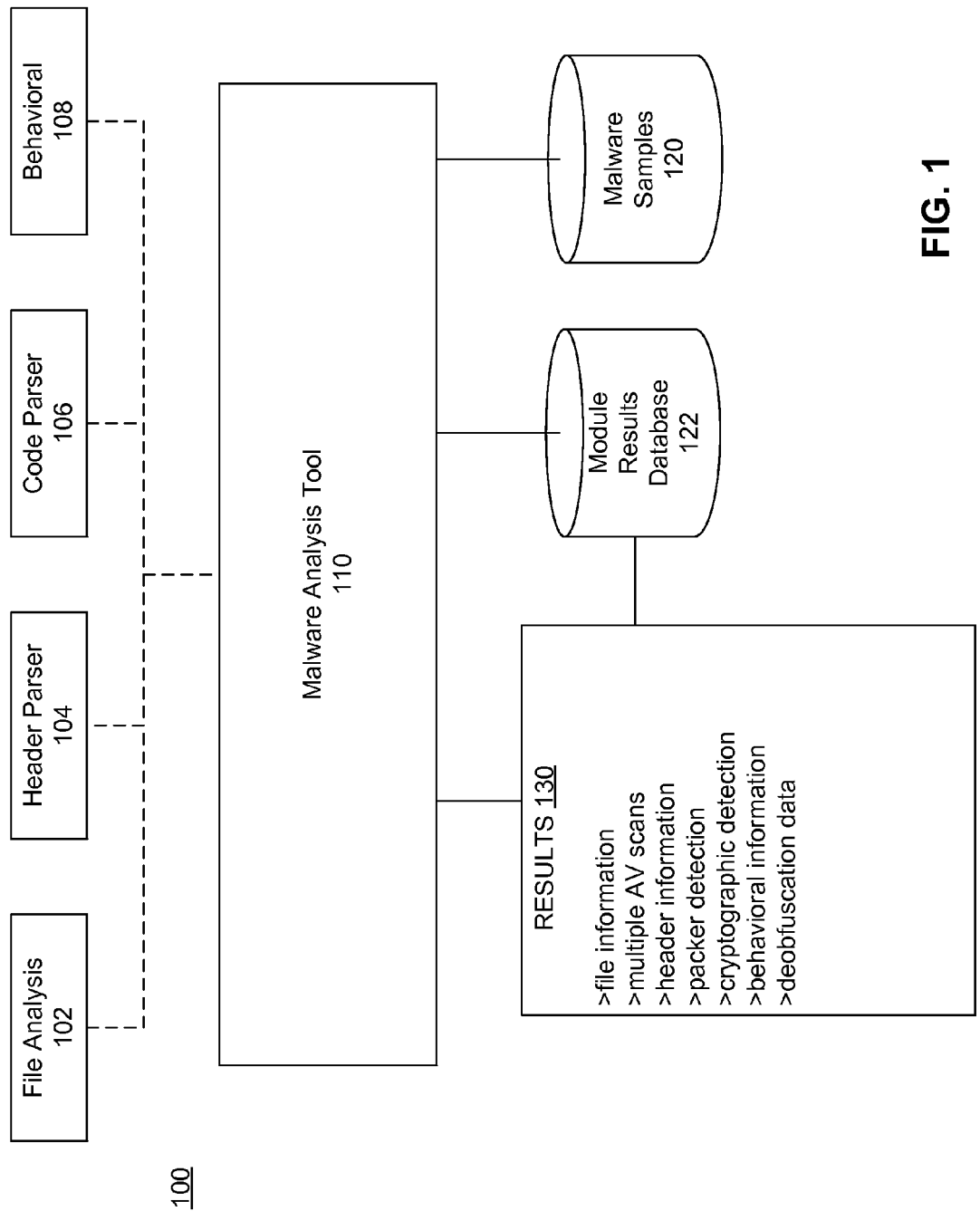
FIG. 1 illustrates a system for malware detection and analysis according to an embodiment of the disclosure.

FIG. 1 illustrates a system for malware detection and analysis according to an embodiment of the disclosure. System 100 is designed to analyze and test malware downloaded from a client device of a host network. Malware may attack this host network infrastructure using several possible methods, including but not limited to: network protocol exploits, attachment to media files, and malicious download scripts or links executed via webpages.

Malware is typically received as a binary executable (i.e., machine code), and thus understanding the functionality and capabilities of the received malware file involves several forms of analysis. As described below, system 100 integrates malware analysis modules (i.e., control logic and/or software) and other computing resources to automate and efficiently process malware. These resources may be scaled to increase when the system is analyzing newer and/or more significantly threatening malware.

System 100 is shown to be communicatively coupled to four example modules that represent some (but not all) typical malware analysis tools: file analysis module 102, header parser module 104, code parsing module 106 and behavioral module 108. In other embodiments, system 100 may include more or fewer module instances.

File analysis module 102 gathers information about a received malware file. This may include file size, packer/compiler information, cryptographic information of the malware file, cryptographic hashes, and file type information. Cryptographic hashes may be, for example, a hash of a received binary executable, which may serve to identify the malware file and to determine if the file has been previously received. For example, cryptographic hashes of received malware samples may be stored in analysis data database 122 (described in further detail below). If a cryptographic hash of a received malware sample is not found in the database, further analysis may be executed; otherwise, the received sample with may be linked with a previously processed and analyzed malware sample to prevent redundant processing and storage. Some malware source code, however, obfuscates the resulting binary executable by varying the code and altering its size. In this scenario, further detail about the received malware is necessary to determine if it has been previously analyzed by the system.

As malware is typically received as a binary executable, some form of reverse engineering is used to convert the machine code into source code. Reverse engineering a binary executable may be a time and resource intensive process, especially if the malware in binary form is obfuscated.

Header parser module 104 may gather information such as imported digital linked libraries (DLL) functions, the sections and their sizes, the entry point for code execution, etc. This information may useful for grouping malware that has been packed or obfuscated by similar tools. Code parser module 106 unpacks the received malware file into a source code state, which is likely obfuscated.

Obfuscation, as referred to herein, describes techniques to hide the behavior and purpose of an executable in order to make analysis and removal of the file more difficult. Software obfuscation of malware may include: unnecessary or confusing instruction sequences such as useless/placebo routines or functions including an unnecessarily high number of operations, unnecessary jumps or opaque predicates, unnecessary use of the stack or registers, confusing variable names in code to conceal data or instructions, and other techniques intended to prolong a reverse engineering process.

Deobfuscation algorithms involve some form of pattern matching and/or behavioral analysis of a binary executable in order to identify its functionality. Deobfuscation algorithms may generate simplified versions of obfuscated code in order to aid the reverse engineering process.

Behavior analysis module 108 gathers information about the received malware file when it is executed. Behavior analysis module 108 may execute the received malware file in a protected virtualized environment, non-virtualized environment, or both. Some malware are capable of detecting when they are being executed in a virtualized environment and alter their behavior as a result; behavior analysis module 108 may detect this difference by executing the malware file in multiple types of environments, and comparing the runtime data of each environment.

Malware analysis tool 110 is shown to be capable of working with each of the described modules in a scalable and modular manner to generate results 130, described in further detail below. Malware analysis tool 100 is shown to be communicatively coupled to malware sample database 120 and module results database 122.

Malware analysis tool 110 provides an automated and modular analysis system via a frontend accessible by a plurality of networked systems. Thus, an analyst familiar with the reverse engineering or deobfuscation processes who has an execution environment prepared for this purpose does not have to spend time or resources manually running the malware through a suite of tools; said manual process can be time-consuming, causing costly delay in implementing remediation steps for an infected client device or host network.

Using malware analysis tool 110, a client device on a host network may submit a malware sample and, after a short delay, begin receiving malware-related signatures for network, file system, registry, etc. to assist in determining remediation steps, either from malware analysis modules executing in real time, or from module results database 122. Embodiments of the invention may provide a programmatic access to data stored in databases 120 and 122 to other communities' malware analysis tools; in other words, embodiments of the invention may allow other tools/devices to selectively search for common attributes of received malware samples. This process may include receiving a request from a third party application or client device via a network; said request may pertain to module results, malware samples, metadata, etc. In response to this request, malware analysis tool 110 may selectively share and communicate the results to the third party application/client device in a programmatically accessible format. Providing programmatic access to the shared data also allows malware tools to inspect multiple enterprise computing resources in search for dormant malware.

During the time in which the various modules of malware analysis tool are examining suspicious binaries, the user of the client device on the host network can perform other tasks important to the investigation—such as filing incident reports, notifying appropriate personnel, alerting central incident response teams, etc. The database backend of malware analysis tool 110 (i.e., databases 120 and 122) may also aid in searching for common attributes in other malware samples that others may have already been analyzed in-depth.

Results 130 is shown to be a list of example data that may be generated via modules 102, 104, 106 and 108: file information, multiple anti-virus scan results that may identify the malware, header information, packer detection (i.e., compiler information), cryptographic detection, behavioral information, and other deobfuscation data.

Figure 2:
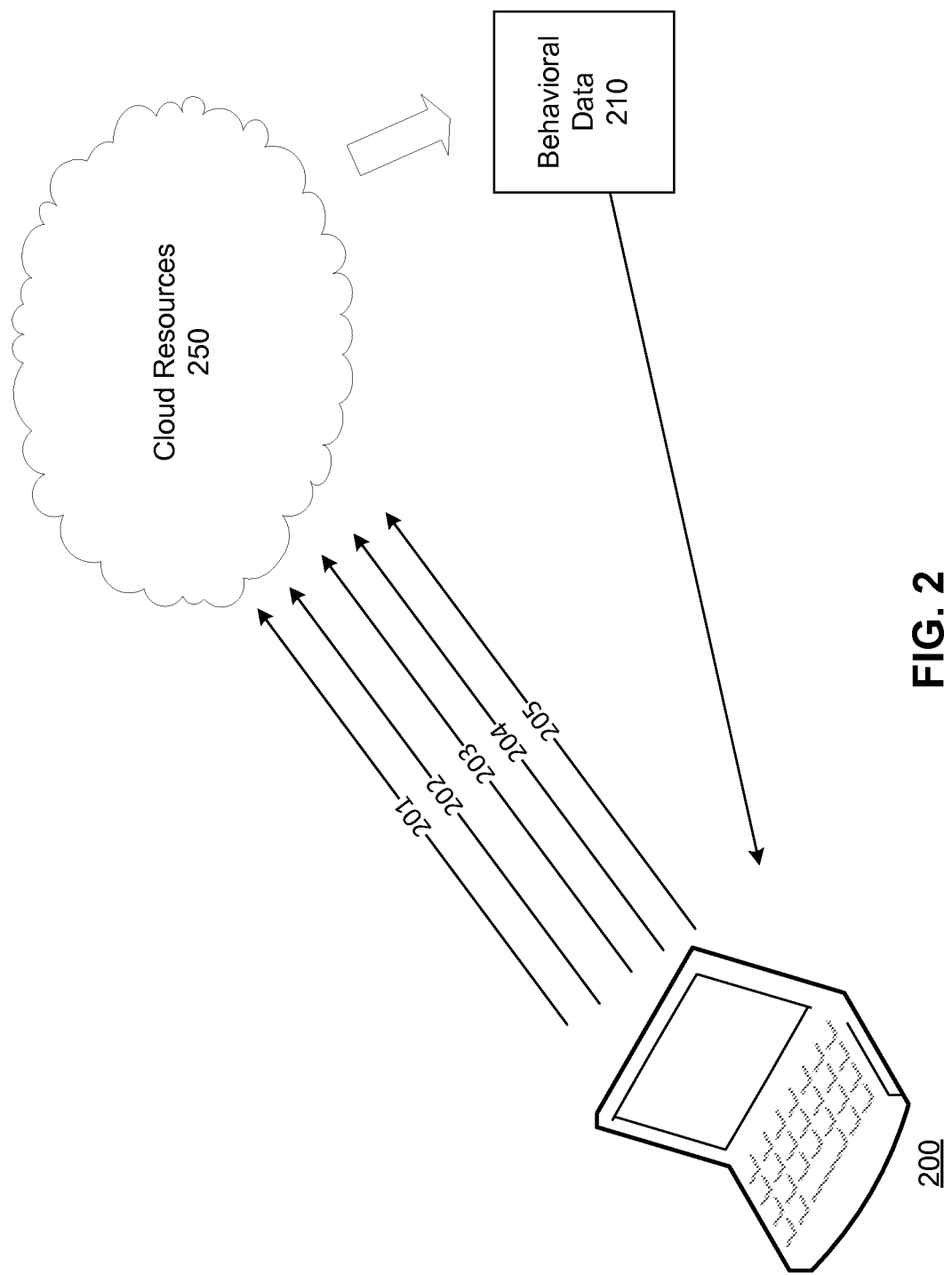
FIG. 2 is an illustration of a scalable malware analysis tool according to an embodiment of the disclosure.

FIG. 2 is an illustration of a scalable malware analysis tool according to an embodiment of the disclosure. In this embodiment, client device 200 is shown to issue several behavioral analysis requests to cloud resources 250. 'Cloud resources' as referred to herein may describe any network accessible dynamically scalable resources, including non-virtual and/or virtual network based services, which appear to be provided by physical server hardware but are actually provided by virtual hardware, simulated by software running on one or more real machines. Because said virtual servers do not physically exist, they may be moved around and scaled up (or down) on the fly more easily compared to non-virtual (i.e., physical) server hardware. In some embodiments, a cloud resource management interface object may be executed to request a specific group/cluster of resources.

Client device 200 is shown to request behavioral analysis data for several server applications; in this example, these requests include Domain Name System (DNS) request 201, HyperText Transfer Protocol (HTTP) request 202, Internet Relay Chat (IRC) request 203, File Transfer Protocol (FTP) request 204, and Simple Mail Transfer Protocol (SMTP) request 205. These requests are sent to cloud resources 250 to execute each of the respective server applications, alternatively referred to herein as "fake services." These fake services are to create an environment to cause a malware file to interact with the server and divulge as much information about itself as possible. For example, Trojan malware downloaders often make an HTTP request to download the next stage for a malware infection. During the requested behavioral analysis, said Trojan downloader running on the cloud resources 250 may cause a DNS request to be generated requesting the IP address for a domain. The fake DNS server responds with its own IP address. This would be followed by an HTTP request from the malware for the specific URL encoded in the downloader and some generic response.

Thus cloud resources 250 may execute any number of malware modules, such as the behavioral analysis modules in this example, to gather runtime data, such as network traffic data, during the execution of the received malware file. Following the execution of the malware modules, a disk image may be acquired and analyzed to look for modifications to the file system and registry (if applicable). Additionally, network traffic may analyzed for specific queries and other pertinent information. All of this information may then be packaged as behavioral data 210 and sent back to the client modular analysis tool (i.e., frontend interface) for processing and data result storage. In the example of the Trojan downloader mentioned previously, the DNS and HTTP queries would be part of the information stored in a local or networked database. Furthermore, providing programmatic access to this runtime data allows for automation in analyzing network traffic related to executables and other potentially malicious carrier files as they traverse network boundaries.

Figure 3:
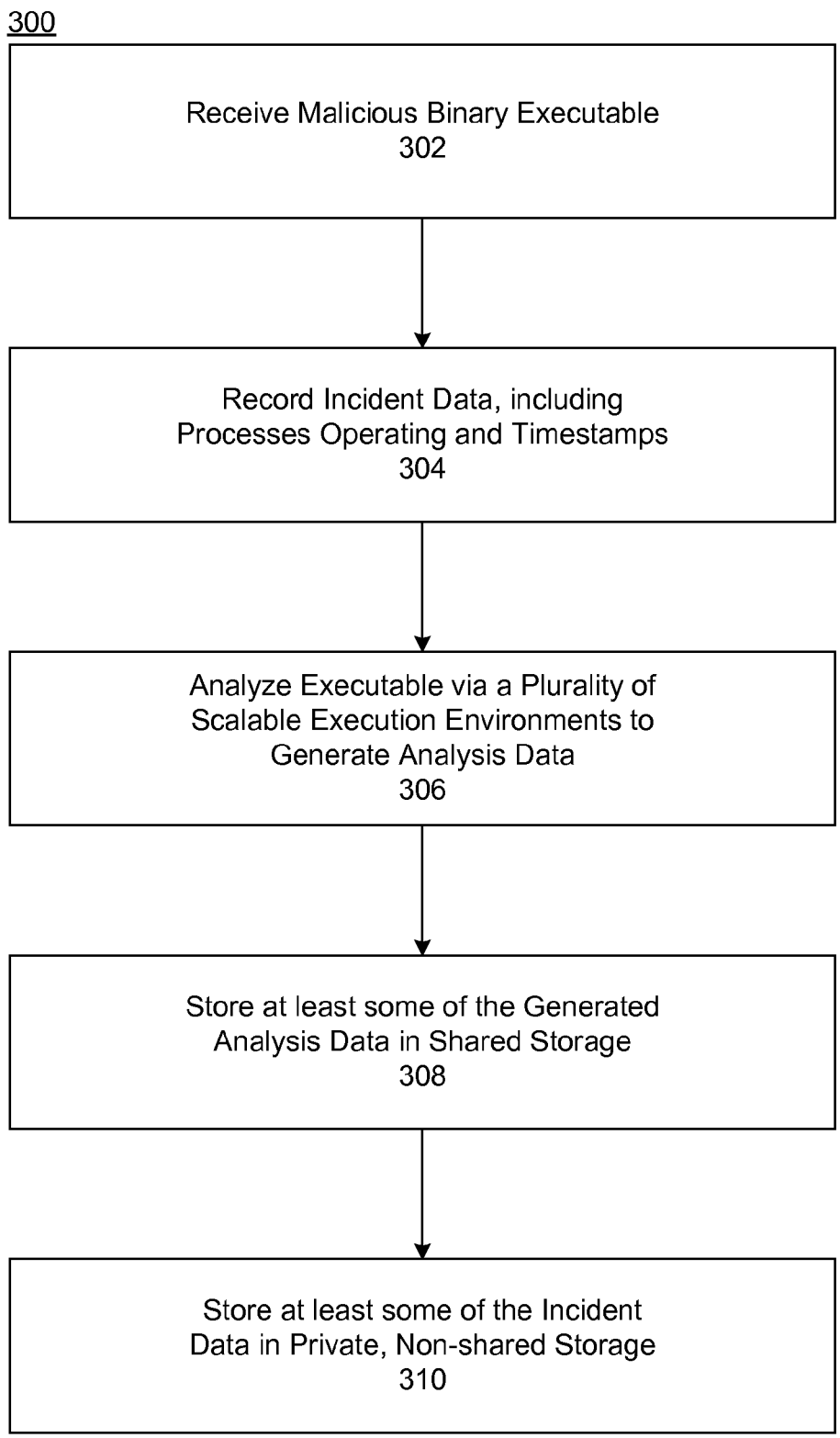
FIG. 3 is a flow diagram of a process for analyzing a received malware sample according to an embodiment of the disclosure.

FIG. 3 is a flow diagram of a process for analyzing a received malware sample according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 300 includes operations for receiving a binary executable on a host device, 302, where the binary executable is a malware file having some form of obfuscation. On the host device, incident data of processes operating on the host device and timestamps associated with when the binary executable was received are recorded, 304. This incident data may be used to determine whether any applications were used to introduce the malware to the host device; this data may be selectively shared with other networked communities, as described below.

The malware file is analyzed via a scalable plurality of execution environments, 306, to generate at least some file information data, runtime data (i.e., behavioral data) and deobfuscation data. These scalable execution environments may include one or more virtualized environments and one or more non-virtualized environment, and each may execute a different malware analysis module. Analyzing the malware may also include searching one or more databases shared with other networked communities for other runtime data and other deobfuscation data associated with other malware.

This generated runtime data and/or deobfuscation data attributable to the malware may be stored in the shared database, 308, for future collaborative malware analysis. At least some of the incident data may be stored in a private, non-shared database. 310, for local analysis. Both the shared and private data may further include metadata to assist subsequent searches in identifying the relevant runtime data, deobfuscation data, incident data, etc.

Figure 4:
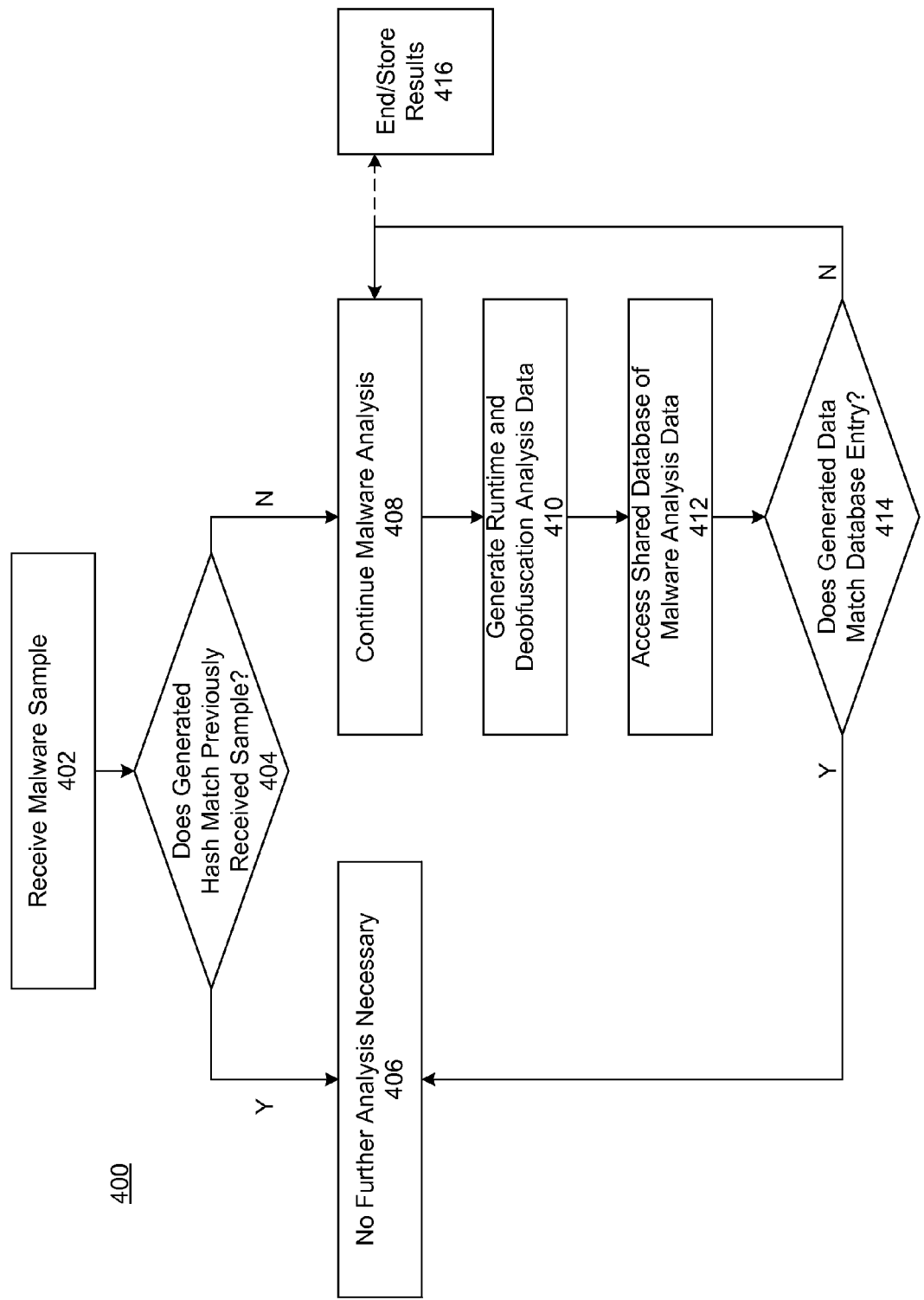
FIG. 4 is a flow diagram of a process for malware analysis according to an embodiment of the disclosure.

FIG. 4 is a flow diagram of a process for malware analysis according to an embodiment of the disclosure. In this embodiment, process 400 includes operations for receiving a malware sample, 402, either via a user submission or through real-time analysis of incoming network traffic. For each malware sample that is received, a hash is generated as an identifier for received malware samples to identify previously received files (e.g., a hash consistent with a Message-Digest Algorithm 5 (MD5) or a Secure Hash Algorithm 1 (SHA-1)). A comparison of previously received and analyzed malware samples is made, 404. If there is a match to a previously executed malware sample, no further analysis is necessary, 406; otherwise analysis continues, 408.

FIG. 5 is an illustration of file information for received malware according to an embodiment of the disclosure. File information 500 illustrates a portion of information for a received malware sample ('file_name1') that may be generated and stored in a private or shared database. File information 500 is shown to include a generated hash key, file name, file size and incident date. File information 510 illustrates a portion of file information for a previously received malware ('file_name2') having a different generated hash key, file name, file size and incident date. As discussed further below, some malware obfuscation techniques generate different executable file sizes (and thus will generate different hashes) for the same malicious software to confuse standard anti-virus scanners; however, embodiments of the invention are able to execute various modules to detect whether a malicious software or routine has previously been analyzed in spite of said obfuscation, in order to avoid duplicating work and more efficiently address any damage to the receiving host system.

Referring back to FIG. 4, one or more modules are executed on the received malware sample to generate runtime and deobfuscation data, 410. After a certain number of modules are executed (e.g., one or more modules), the generated data may be compared to determine if the received malware sample matches a previously analyzed sample by accessing a database shared by several networked communities, 412. Thus, addition to providing programmatic access to data as described above, embodiments of the invention may also request programmatic access to samples and metadata generated from analysis modules of other networked communities. This enables the development of robust machine learning algorithms and techniques that automatically and more accurately makes decisions on the maliciousness of received executables. Machine learning algorithms may dynamically develop criteria to determine the likelihood that a received executable is malicious based on accumulated runtime and incident data. By providing and utilizing programmatic access to this data, embodiments of the invention provide machine learning algorithms more access to analyzed, relevant data and thus provide for more accurate and efficient machine learning.

If the generated runtime data (i.e., behavioral data) or deobfuscation data matches, 414, no further analysis is necessary, 406; otherwise analysis may continue 408, until the all testing modules are executed (in which case, the data is stored in the shared database, 416).

Figure 6:
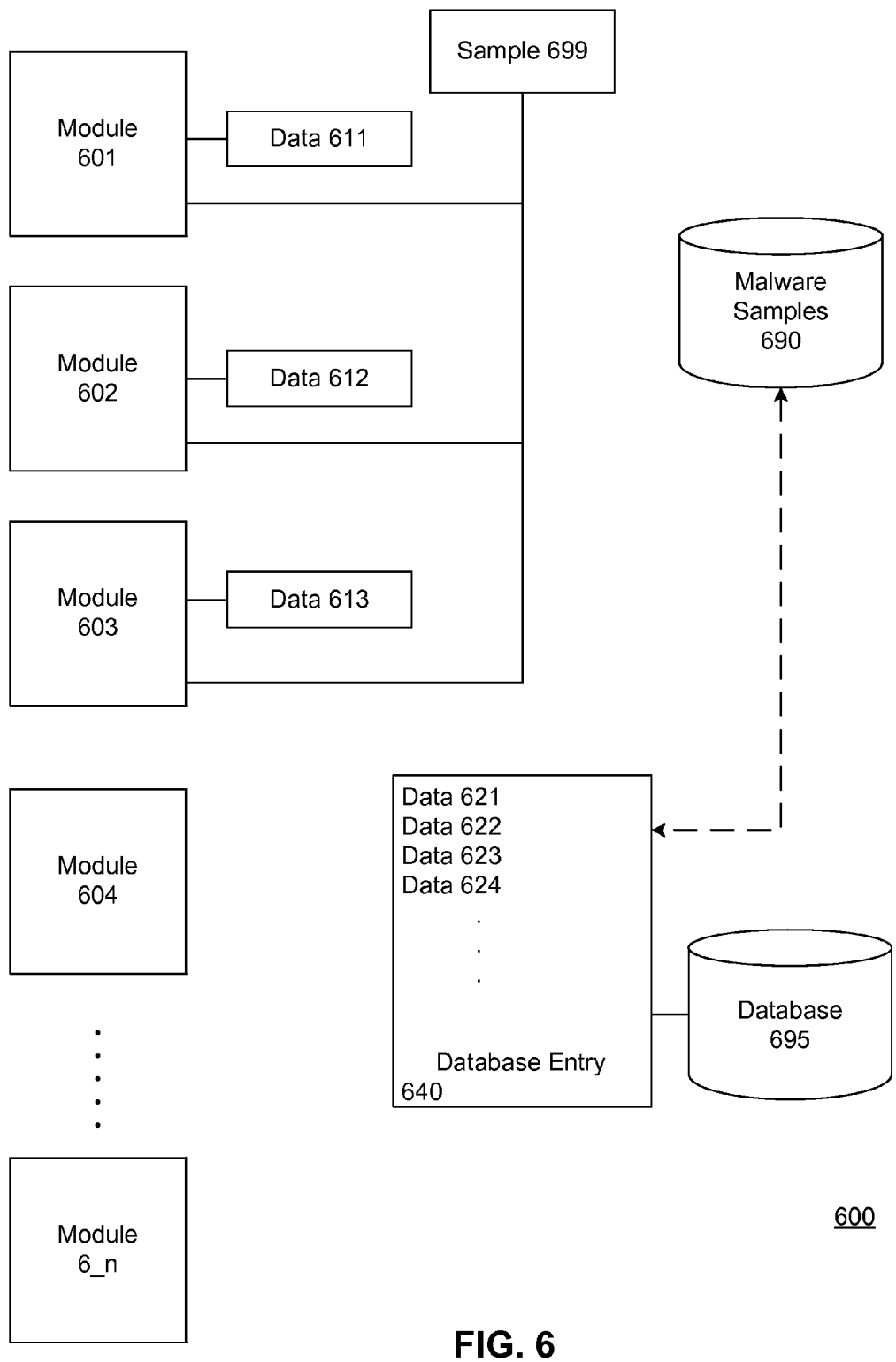
FIG. 6 is an illustration of generated and stored analysis module data according to an embodiment of the disclosure.

FIG. 6 is an illustration of generated and stored analysis module data according to an embodiment of the disclosure. In this embodiment, malware analysis tool 600 is shown to be capable of executing n modules 601-6_n. Malware sample 699 (which corresponds to 'file_name1' illustrated in FIG. 5) is analyzed through modules 601-603, which may comprise behavioral and code extraction modules to generate data 611-613. In this embodiment, these data samples are searched and compared to entries in analysis data database 695, which retrieves database entry 640 corresponding to a previously analyzed malware sample stored in malware sample database 690 ('file_name2' illustrated in FIG. 5). In this example, data 621-623 of database entry 640 matches data 611-613 generated by modules 601-603; thus malware analysis tool 600 may determine that malware sample 699 corresponds to a previously analyzed malware sample (stored in database 690), and cease analysis, as execution of module 604 would result in data corresponding to data 624 of database entry 640, and so forth.

This comparison shows that these two malware samples, while having different file attributes as illustrated in FIG. 5, may exhibit the same runtime behavior and the same extracted code functionality; thus malware analysis tool 600 concludes that they are the same malware, and previously successful remediation routines may be implemented.

Figure 7:
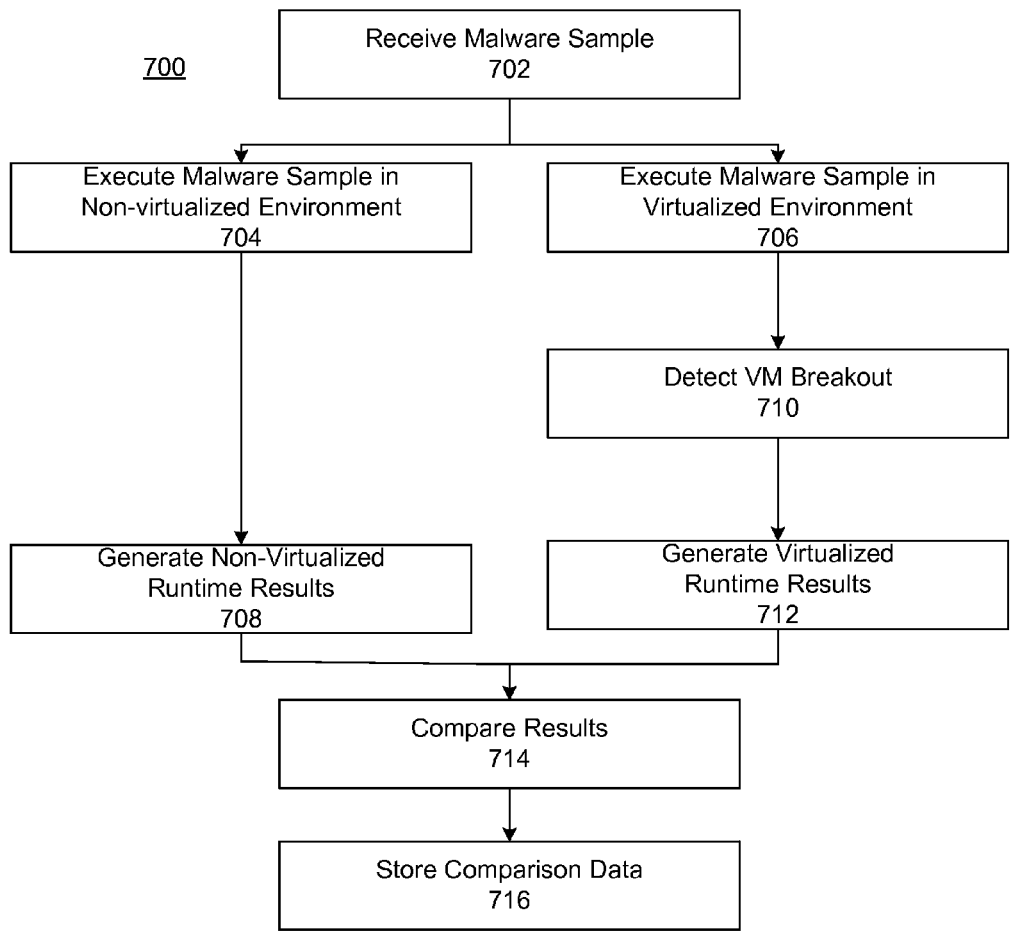
FIG. 7 is a flow diagram of a process for executing malware in virtualized and non-virtualized execution environments according to an embodiment of the disclosure.

FIG. 7 is a flow diagram of a process for executing malware in virtualized and non-virtualized execution environments according to an embodiment of the disclosure. In this embodiment, process 700 includes operations for receiving a malware sample, 702, and executing the sample in a non-virtual environment, 704, and a virtual environment, 706. These environments may be "cloud-based" execution environments, which can scale according to the demands of the testing suite. The malware is executed in the non-virtual execution environment(s) to generate runtime results, 708.

Executing the malware sample in virtualized execution environments may involve more analysis, as some malware is capable of detecting when it is being executed via a virtual machine; for example, virtual machine breakout (alternatively referred to as virtual machine escape), which is a process of breaking out of a virtual machine and interacting with the host operating system, may be attempted by a piece of malware. Modules executing in the virtual environment may detect any attempts at virtual machine breakout, 710, and halt execution of the malware. The results of executing the malware in the virtual execution environment(s), including any attempt at a virtual machine breakout, are generated, 712. The runtime results of the virtual execution environment may include an image of the environment that can later be restored and analyzed. The results for the non-execution and execution environments are compared, 714, and any similarities or differences are further noted for the malware sample, 716.

Figure 8:
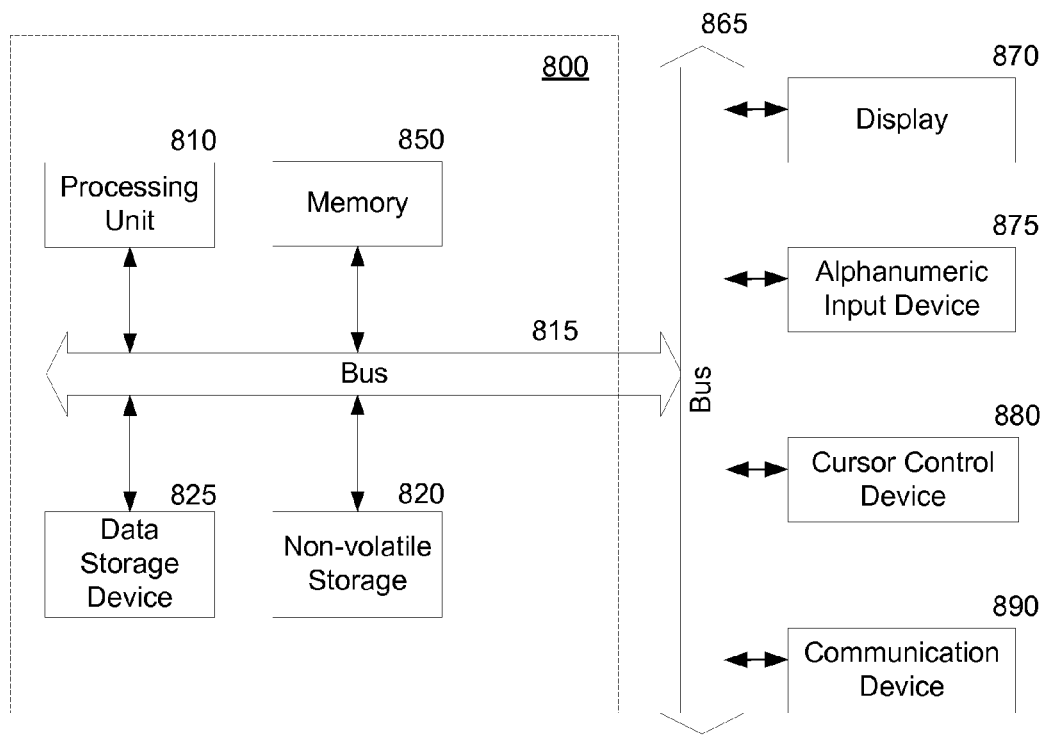
FIG. 8 is an illustration of a computing device to utilize an embodiment of the disclosure.

FIG. 8 is an illustration of a computing device to utilize an embodiment of the disclosure. Platform 800 may be used to execute any portion of the malware analysis execution environment described above. Platform 800 as illustrated includes bus or other internal communication means 815 for communicating information, and processor 810 coupled to bus 815 for processing information. The platform further comprises random access memory (RAM) or other volatile storage device 850 (alternatively referred to herein as main memory), coupled to bus 815 for storing information and instructions to be executed by processor 810. Main memory 850 also may be used for storing temporary variables or other intermediate information during execution of instructions by processor 810. Platform 800 also comprises read only memory (ROM) and/or static storage device 820 coupled to bus 815 for storing static information and instructions for processor 810, and data storage device 825 such as a magnetic disk, optical disk and its corresponding disk drive, or a portable storage device (e.g., a universal serial bus (USB) flash drive, a Secure Digital (SD) card). Data storage device 825 is coupled to bus 815 for storing information and instructions.

Platform 800 may further be coupled to display device 870, such as a cathode ray tube (CRT) or an LCD coupled to bus 815 through bus 865 for displaying information to a computer user. In embodiments where platform 800 provides computing ability and connectivity to a created and installed display device, display device 870 may comprise any of the created and display devices described above. Alphanumeric input device 875, including alphanumeric and other keys, may also be coupled to bus 815 through bus 865 (e.g., via infrared (IR) or radio frequency (RF) signals) for communicating information and command selections to processor 810. An additional user input device is cursor control device 880, such as a mouse, a trackball, stylus, or cursor direction keys coupled to bus 815 through bus 865 for communicating direction information and command selections to processor 810, and for controlling cursor movement on display device 870. In embodiments utilizing a touch-screen interface, it is understood that display 870, input device 875 and cursor control device 880 may all be integrated into a touch-screen unit.

Another device, which may optionally be coupled to platform 800, is a communication device 890 for accessing other nodes of a distributed system via a network. Communication device 890 may include any of a number of commercially available networking peripheral devices such as those used for coupling to an Ethernet, token ring, Internet, or wide area network. Communication device 890 may further be a null-modem connection, or any other mechanism that provides connectivity between computer system 800 and the outside world. Note that any or all of the components of this system illustrated in FIG. 8 and associated hardware may be used in various embodiments of the disclosure.

It will be appreciated by those of ordinary skill in the art that any configuration of the system illustrated in FIG. 8 may be used for various purposes according to the particular implementation. The control logic or software implementing embodiments of the disclosure can be stored in main memory 850, mass storage device 825, or other storage medium locally or remotely accessible to processor 810. It will be apparent to those of ordinary skill in the art that any system, method, and process to capture media data as described herein can be implemented as software stored in main memory 850 or read only memory 820 and executed by processor 810. This control logic or software may also be resident on an article of manufacture comprising a computer readable medium having computer readable program code embodied therein and being readable the mass storage device 825 and for causing processor 810 to operate in accordance with the methods and teachings herein.

Embodiments of the disclosure may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a LCD or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 810, data storage device 825, bus 815, and memory 850, and only rudimentary communications mechanisms, such as a small touch-screen that permits the user to communicate in a basic manner with the device. In general, the more special-purpose the device is, the fewer of the elements need be present for the device to function.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise.

The order in which some or all of the process blocks appear in each process should not be deemed limiting. Rather, one of ordinary skill in the art having the benefit of the present disclosure will understand that some of the process blocks may be executed in a variety of orders not illustrated.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a non-transitory computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer readable storage medium including instructions that, when executed by a processor, cause the processor to perform a method comprising:
    receiving a binary executable comprising obfuscated malware on a host device;
    recording incident data indicating a time when the binary executable was received and identifying processes operating on the host device at the time;
    analyzing the binary executable via a scalable plurality of execution environments, including one or more non-virtual execution environments and one or more virtual execution environments, to execute a plurality of malware analysis modules and to generate runtime data based on execution of the obfuscated malware and deobfuscation data attributable to the binary executable, wherein the deobfuscation data is generated based on an identification of a simplified version of the obfuscated malware;
    storing the runtime data and deobfuscation data attributable to the binary executable in a shared database;
    storing the incident data in a private, non-shared database other than the shared database, wherein, of the shared database and the private, non-shared database, the incident data is available only via the private, non-shared database; and
    increasing the scalable plurality of execution environments to execute the plurality of malware analysis modules, the increasing based, at least in part, on the generated runtime data.

2. The non-transitory computer readable storage medium of claim 1, wherein the method further comprises:
    generating a first hash data from the binary executable via at least one of a Message-Digest Algorithm 5 (MD5) or a Secure Hash Algorithm 1 (SHA-1); and
    searching the shared database for hash data that matches the first hash data and that is associated with a previously received binary executable.

3. The non-transitory computer readable storage medium of claim 2, wherein the method further comprises:
    in response to the searching identifying hash data that matches the first hash data, not analyzing the binary executable via the scalable plurality of execution environments.

4. The non-transitory computer readable storage medium of claim 2, wherein the method further comprises:
    in response to a failure of the searching to find second hash data that matches the first hash data, searching the shared database for a second set of runtime data and deobfuscation data associated with the previously received binary executable; and
    in response to the second set of runtime data and deobfuscation data matching the runtime data and deobfuscation data attributable to the binary executable, identifying the binary executable as the previously received binary executable.

5. The non-transitory computer readable storage medium of claim 1, wherein the plurality of malware analysis modules includes:
    one or more behavioral analysis modules to execute the received binary executable; and
    one or more deobfuscation modules to generate source code from the received binary executable.

6. The non-transitory computer readable storage medium of claim 5, wherein the one or more behavioral analysis modules further to:
    execute the received binary executable in a virtualized environment and generate a first set of runtime data;
    execute the received binary executable in a non-virtualized environment and generate a second set of runtime data different than the first set of runtime data; and
    generate a comparison of the first set of runtime data and the second set of runtime data
    storing information, based on the comparison, indicating an ability of the obfuscated malware to detect execution in a virtualized environment.

7. The non-transitory computer readable storage medium of claim 5, wherein the one or more behavioral analysis modules includes:
    a first behavioral module to execute the received binary executable in a virtualized environment and generate a first set of runtime data; and
    a second behavioral module to execute the received binary executable in a non-virtualized environment and generate a second set of runtime data different than the first set of runtime data.

8. The non-transitory computer readable storage medium of claim 7, wherein the first behavioral module to stop execution of the received binary executable upon detection of a virtual machine breakout attempt.

9. The non-transitory computer readable storage medium of claim 1, wherein the method further comprises:
    providing a programmatic access to at least some of the runtime data and deobfuscation data attributable to the binary executable.

10. The non-transitory computer readable storage medium of claim 1, wherein the method further comprises:
    transmitting a programmatic access request to a second device for a second set of runtime data and deobfuscation data associated with a binary executable previously analyzed by the second device.

11. A system comprising:
    a host device to receive a binary executable comprising obfuscated malware;

malware detection logic to record incident data indicating a time when the binary executable was received and identifying processes operating on the host device at the time;

a network interface; and malware analysis logic to:

send requests, via the network interface, to a scalable plurality of execution environments to analyze the received binary executable via a plurality of malware analysis modules for generating runtime data based on execution of the obfuscated malware and deobfuscation data attributable to the binary executable, wherein the plurality of execution environments includes one or more non-virtual execution environments and one or more virtual execution environments, wherein the deobfuscation data is generated based on an identification of a simplified version of the obfuscated malware;

store the incident data in a private, non-shared database;

transmit the runtime data and deobfuscation data attributable to the binary executable to a shared database other than the private, non-shared database via the network interface, wherein, of the shared database and the private, non-shared database, the incident data is available only via the private, non-shared database; and increase the scalable plurality of execution environments to execute the plurality of malware analysis modules, the increasing based, at least in part, on the generated runtime data.

12. The system of claim 11, the malware analysis logic to further:

generate a first hash data from the binary executable via at least one of a Message-Digest Algorithm 5 (MD5) or a Secure Hash Algorithm 1 (SHA-1); and transmit a search to the shared database for hash data that matches the first hash data and that is associated with a previously received binary executable.

13. The system of claim 12, the malware analysis logic to further:

in response to the search identifying hash data that matches the first hash data, not analyze the binary executable via the scalable plurality of execution environments.

14. The system of claim 12, the malware analysis logic to further:

in response to a failure of the searching to find second hash data that matches the first hash data, search the shared database for a second set of runtime data and deobfuscation data associated with the previously received binary executable; and in response to the second set of runtime data and deobfuscation data matching the runtime data and deobfuscation data attributable to the binary executable, identify the binary executable as the previously received binary executable.

15. The system of claim 11, wherein the plurality of malware analysis modules includes:

one or more behavioral analysis module to execute the received binary executable; and one or more deobfuscation module to generate source code from the received binary executable.

16. The system of claim 15, wherein the one or more behavioral analysis modules includes:

a first behavioral module to execute the received binary executable in a virtualized environment and generate a first set of runtime data; and a second behavioral module to execute the received binary executable in a non-virtualized environment and generate a second set of runtime data different than the first set of runtime data.

17. The system of claim 16, wherein the first behavioral module to stop execution of the received binary executable upon detection of a virtual machine breakout attempt.

18. The system of claim 16, wherein the first set of runtime data generated by the first behavioral module includes an image of the virtualized environment, and is included in the at least some of the runtime data and deobfuscation data attributable to the binary executable stored in the shared database.

19. The system of claim 11, wherein the network interface to further execute a cloud resource management interface object, and wherein requests sent to a scalable plurality of execution environments are directed to an identified set of cloud computing resources.

* * * * *